United States Patent
Liu et al.

(10) Patent No.: US 10,303,491 B2
(45) Date of Patent: May 28, 2019

(54) METHOD AND DEVICE OF RUNNING APPLICATION PROGRAM ACROSS SYSTEMS

(71) Applicant: PAX COMPUTER TECHNOLOGY (SHENZHEN) CO., LTD., Shenzhen, Guangdong (CN)

(72) Inventors: Shaohai Liu, Guangdong (CN); Xianwu Ruan, Guangdong (CN); Renchi Zheng, Guangdong (CN); Lihong Xie, Guangdong (CN)

(73) Assignee: PAX COMPUTER TECHNOLOGY (SHENZHEN) CO., LTD., Shenzhen, Guangdong (CN)

( * ) Notice: Subject to any disclaimer, the term of this patent is extended or adjusted under 35 U.S.C. 154(b) by 88 days.

(21) Appl. No.: 15/552,034

(22) PCT Filed: Nov. 17, 2016

(86) PCT No.: PCT/CN2016/106221
§ 371 (c)(1),
(2) Date: Aug. 18, 2017

(87) PCT Pub. No.: WO2018/036000
PCT Pub. Date: Mar. 1, 2018

(65) Prior Publication Data
US 2018/0321955 A1   Nov. 8, 2018

(30) Foreign Application Priority Data
Aug. 23, 2016   (CN) .......................... 2016 1 0710638

(51) Int. Cl.
*G06F 9/44* (2018.01)
*G06F 9/445* (2018.01)
*G06F 9/54* (2006.01)
*G06F 9/448* (2018.01)

(52) U.S. Cl.
CPC ............ *G06F 9/44536* (2013.01); *G06F 9/44* (2013.01); *G06F 9/4486* (2018.02); *G06F 9/541* (2013.01)

(58) Field of Classification Search
None
See application file for complete search history.

(56) References Cited

U.S. PATENT DOCUMENTS

2005/0097399 A1   5/2005   Bliss et al.
2006/0080648 A1   4/2006   Anwar et al.

FOREIGN PATENT DOCUMENTS

| CN | 1371053 | 9/2002 |
|----|---------|--------|
| CN | 103631971 | 3/2014 |
| CN | 105786525 | 7/2016 |
| WO | 2010004242 | 1/2010 |

*Primary Examiner* — Craig C Dorais
(74) *Attorney, Agent, or Firm* — Hamre, Schumann, Mueller & Larson, P.C.

(57) ABSTRACT

A method of running an application program across systems is proposed, the method comprises loading a target application program; applying for a memory space on a current operating system for the target application program; modifying an address of a global variable and an address of an absolute jump instruction in the target application program according to an address of the applied memory space to adapt to the memory space of the current operating system; obtaining a SWI instruction of the target application program; and redirecting the SWI instruction to an instruction of calling the current operating system.

10 Claims, 8 Drawing Sheets

METHOD AND DEVICE OF RUNNING APPLICATION PROGRAM ACROSS SYSTEMS

FIELD OF THE INVENTION

The present invention relates to the field of computer processing, and particularly to a method and a device of running an application program across systems.

BACKGROUND OF THE INVENTION

With the development of Internet, in order to meet different operational requirements, different operating systems may be used in different terminals, for example, in order to meet requirements of different customers, it may need to install different operating systems in different POS terminals. However, development of the application program is based on the operating system, and because API interfaces of different operating system are generally different with each other, which means that the application program developed based on a certain operating system cannot be directly run on other operating systems, and can be run on other operating systems only if original codes of the application program needs to be modified, so that the operation process is very troublesome.

SUMMARY OF THE INVENTION

Accordingly, it is necessary to provide a method and a device of running an application program across systems, which can be operated simply.

A method of running an application program across systems, the method including: loading a target application program; applying for a memory space on a current operating system for the target application program; modifying an address of a global variable and an address of an absolute jump instruction in the target application program according to an address of the applied memory space to adapt to the memory space of the current operating system; obtaining a SWI instruction of the target application program; and redirecting the SWI instruction to an instruction of calling the current operating system.

In an embodiment, after the step of loading the target application program, the method further includes translating an instruction in the target application program in a manner of binary translation.

In an embodiment, prior to the step of modifying the address of the global variable and the address of the jump instruction in the target application program according to the address of the applied memory space to adapt to the memory space of the current operating system, the method further includes: obtaining binary data of the target application program; and finding the global variable and the absolute jump instruction in the target application program by analyzing the binary data.

In an embodiment, the step of finding the global variable and the absolute jump instruction in the target application program by analyzing the binary data includes: locating absolute addresses corresponding to the global variable and the absolute jump instruction in the target application program by analyzing the binary data of the target application program; and extracting the global variable and the absolute jump instruction in the target application program according to the located absolute addresses.

In an embodiment, after the step of redirecting the SWI instruction to the instruction of calling the current operating system, the method further includes: receiving a request of calling an API function initiated by the target application program; and calling a corresponding API function in the current operating system in response to the request according to the redirected SWI instruction.

A device of running an application program across systems, the device including: a loading module configured to load a target application program; an application module configured to apply for a memory space on a current operating system for the target application program; a modification module configured to modify an address of a global variable and an address of an absolute jump instruction in the target application program according to an address of the applied memory space to adapt to the memory space of the current operating system; an instruction obtainment module configured to obtain a SWI instruction of the target application program; and a redirection module configured to redirect the SWI instruction to an instruction of calling the current operating system.

In an embodiment, the device further includes a translation module configured to translate instructions in the target application program in a manner of binary translation.

In an embodiment, the device further includes: a data obtainment module configured to obtain binary data of the target application program; and an analysis module configured to find the global variable and the absolute jump instruction in the target application program by analyzing the binary data.

In an embodiment, the analysis module includes: a location module configured to locate absolute addresses corresponding to the global variable and the absolute jump instruction in the target application program by analyzing the binary data of the target application program; and an extraction module configured to extract the global variable and the absolute jump instruction in the target application program according to the located absolute addresses.

In an embodiment, the device further includes: a reception module configured to receive a request of calling an API function initiated by the target application program; and a call module configured to call a corresponding API function in the current operating system in response to the request according to the redirected SWI instruction.

The above method and device of running the application program across systems apply for the memory space on the current operating system for the target application program by loading the target application program; modify the address of the global variable and the address of the absolute jump instruction in the target application program according to the address of the applied memory space to adapt to the memory space of the current operating system; obtain the SWI instruction of the target application; and redirect the SWI instruction to the instruction of calling the current operating system. The above method enable the application programs of other systems to run on the current operating system by modifying the address of the global variable and the address of the absolute jump instruction in the target application program and redirecting the original SWI instruction of the target application program to the instruction of calling the current operating system. The method does not need to modify source codes of the target application program, so that operation of the application program across systems is simplified significantly.

DETAILED DESCRIPTION OF THE EMBODIMENTS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

Figure 1:
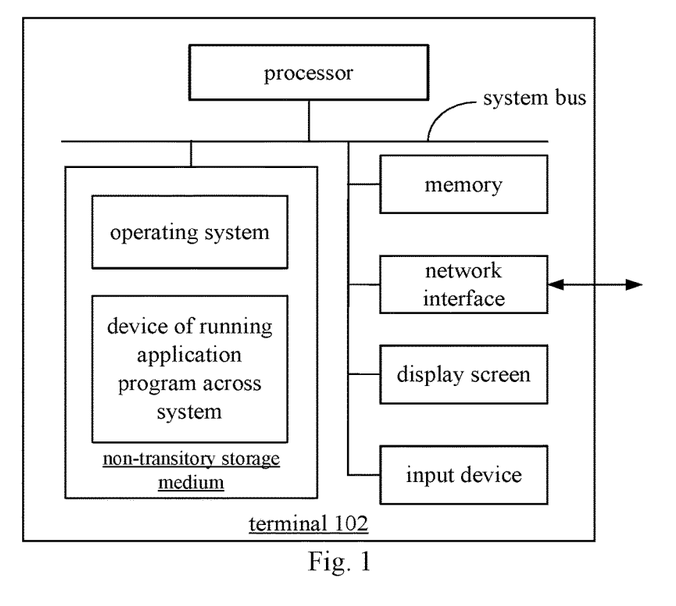
FIG. 1 is an inner schematic diagram of a terminal in an embodiment.

Referring to FIG. 1, in an embodiment, the inner structure of the terminal 100 is shown in FIG. 1. The terminal 100 includes a processor, a memory, a non-transitory storage medium, a network interface, a display screen, and an input device, which are connected via a system bus. the non-transitory storage medium of the terminal 100 stores an operating system and further includes a device of running an application program across systems. The device of running an application program across systems is configured to implement a method of running an application program across systems. The processor is configured to provide computing and control capabilities to support operation of the entire terminal. The memory in the terminal provides an environment for operation of the device of running an application program across systems in the non-transitory storage medium, and the memory may store computer readable instructions which, when executed by the processor, may enable the processor to perform the method of running an application program across systems. The network interface is configured to connect to the network for communication. The display screen of the terminal may be a liquid crystal display screen or an electronic ink display screen and the like. The input device may be a touch layer covering on the display screen or a button, a card slot, a trackball or a touch panel provided on the housing of the electronic device. The input device can also be an external keyboard, touchpad or mouse and the like. The terminal can be a POS machine, a mobile phone, a tablet computer, or a personal digital assistant or a wearable device and the like. It will be understood by those skilled in the art that the structure shown in FIG. 1 is merely a block diagram of a partial structure related to the present solution and does not constitute a limitation on the terminal to which the present solution is applied, and a specific terminal may include more or less parts shown in the drawings, or may combine certain parts, or may an arrangement of different parts.

Figure 2:
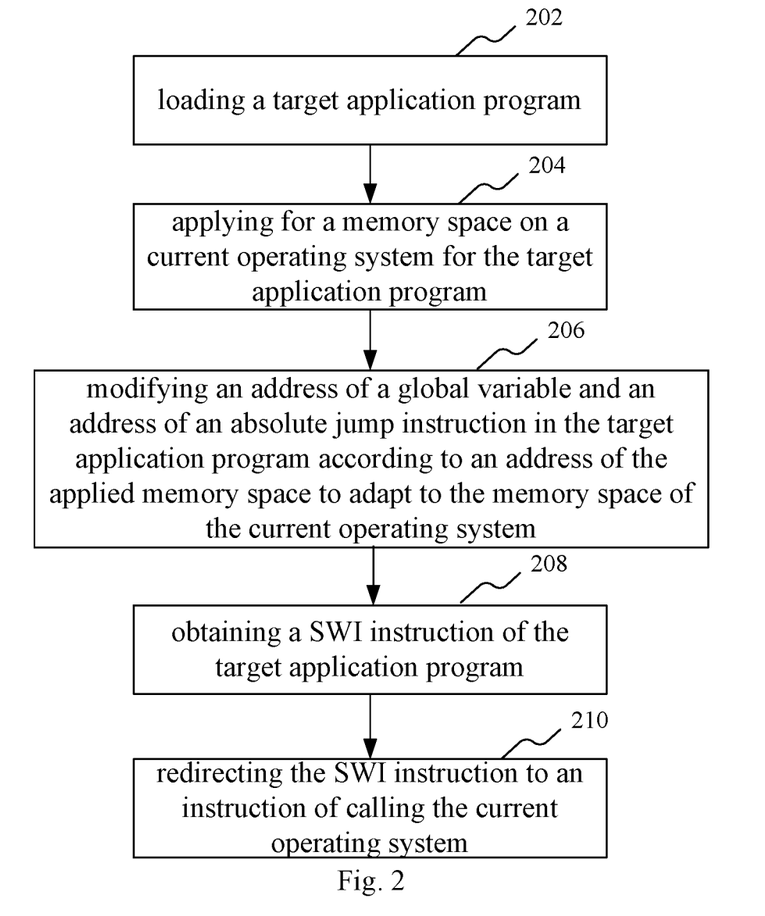
FIG. 2 is a flow chart of a method of running an application program across systems in an embodiment.

Referring to FIG. 2, in an embodiment, a method of running an application program across systems is proposed, and the method includes:

In step 202, a target application program is loaded.

Particularly, the target application program is an application program that cannot be run directly on the current operating system and is developed based on other operating systems. In order to enable the target application program to run across systems, a process virtual machine is proposed. Operation of the target application program across systems is implemented by the process virtual machine. Firstly, the process virtual machine is started to load the target application program; wherein the process virtual machine only need to provide a running environment for the application program and is not related to a specific hardware. The process virtual machine is run in the upper layer of the operating system to provide respective support of executing and terminating the application program.

In step 204, a memory space is applied for on a current operating system for the target application program.

In the present embodiment, after the virtual machine loads the target application program, the memory space is applied for on the current operating system for the target application program, so that the target application program can be run on the current operating system. Particularly, when the virtual machine is started, it will apply for the same virtual address space on the current operating system as the absolute address of the target application program for the target application program, copy the target application program to this address, and find the global variable according to the segment address.

In step 206, the address of the global variable and the address of the absolute jump instruction in the target application program are modified according to an address of the applied memory space to adapt to the memory space of the current operating system.

In the embodiment, the address of the global variable and the address of the absolute jump instruction in the target application program are modified according to an address of the applied memory space to adapt to the memory space of the current operating system; wherein, the global variable is a variable that can be referenced by all objects or functions of the application program. The absolute jump instruction is a jump instruction that the jumped destination address is an absolute address. Particularly, binary data of the target application program is obtained; the global variable and the absolute jump instruction in the target application program is found by analyzing the binary data; and the address of the global variable and the address of the absolute jump instruction in the target application program are modified according to the applied address of the current system to adapt to the memory space of the current operating system.

In step 208, a SWI instruction of the target application program is obtained.

Particularly, the SWI (Software Interrupt) instruction is the instruction that the application program uses to access the operating system. The application program cannot directly operate the operating system, and must call the API (Application Program Interface) provided by the operating system to operate the operating system. However, the API interface of the operating system switches to the kernel state according to the SWI instruction, and then operate the hardware. This is because the operating system authorizes the kernel to manage the hardware operation, and the application program cannot use the hardware randomly. Before the application program uses the hardware, it has to transmit a corresponding request to the operating system. The kernel of the operating system helps the application program to achieve its operation. The operating system provides the application program with some kernel functions that have predetermined functions, i.e. the interface API of the system call. The system call transmits the request of the application program to the kernel, to call the corresponding kernel functions to complete the required processing, and then returns the processing result to the application program.

In step 210, the SWI instruction is redirected to an instruction of calling the current operating system.

In the embodiment, if the target application program needs to call the operating system, it must be called by the SWI instruction. Because the original SWI instruction in the target application program is directed to the instruction calling the original operating system, when data of the target application program is adapted to the applied memory space, the SWI instruction in the target application program is found. Particularly, the SWI instruction has a certain constitution format (including 24 bits significant immediate data). The SWI instruction can be found according to this constitution format, and then the original SWI instruction is modified to the instruction of triggering the current operating system, so as to enter the system call packaged by the current system, which enable the target application program to be run in the current operating system.

In the present embodiment, the virtual machine applies for the memory space on the current operating system for the target application program by loading the target application program; modifies the address of the global variable and the address of the absolute jump instruction in the target application program according to the address of the applied memory space to adapt to the memory space of the current operating system; obtains a SWI instruction of the target application program; and redirects the SWI instruction to an instruction of calling the current operating system. The above method enable the application programs of other systems to run on the current operating system by modifying the address of the global variable and the address of the absolute jump instruction in the target application program and redirecting the original SWI instruction of the target application program to the instruction of calling the current operating system. The method does not need to modify source codes of the target application program, so that operation of the application program across systems is simplified significantly.

In an embodiment, after the step of loading the target application program, the method further includes: instructions in the target application program are translated in a manner of binary translation.

In the embodiment, when the target application program is loaded, the process virtual machine analyzes the target application program, translates the SWI instruction and the related instruction of which the position needs to be modified in binary so as to run the target application program. Compared to the execution manner of conventional interpretation, the binary translation takes up less memory resources, can effectively improve the running speed of the process virtual machine. This is because the process of executing interpretation requires more computation and requires more resources to store intermediate data and results. After codes are translated in the manner of binary translation, the codes can be run directly on the CPU, which does not need the interpretation process.

Figure 3:
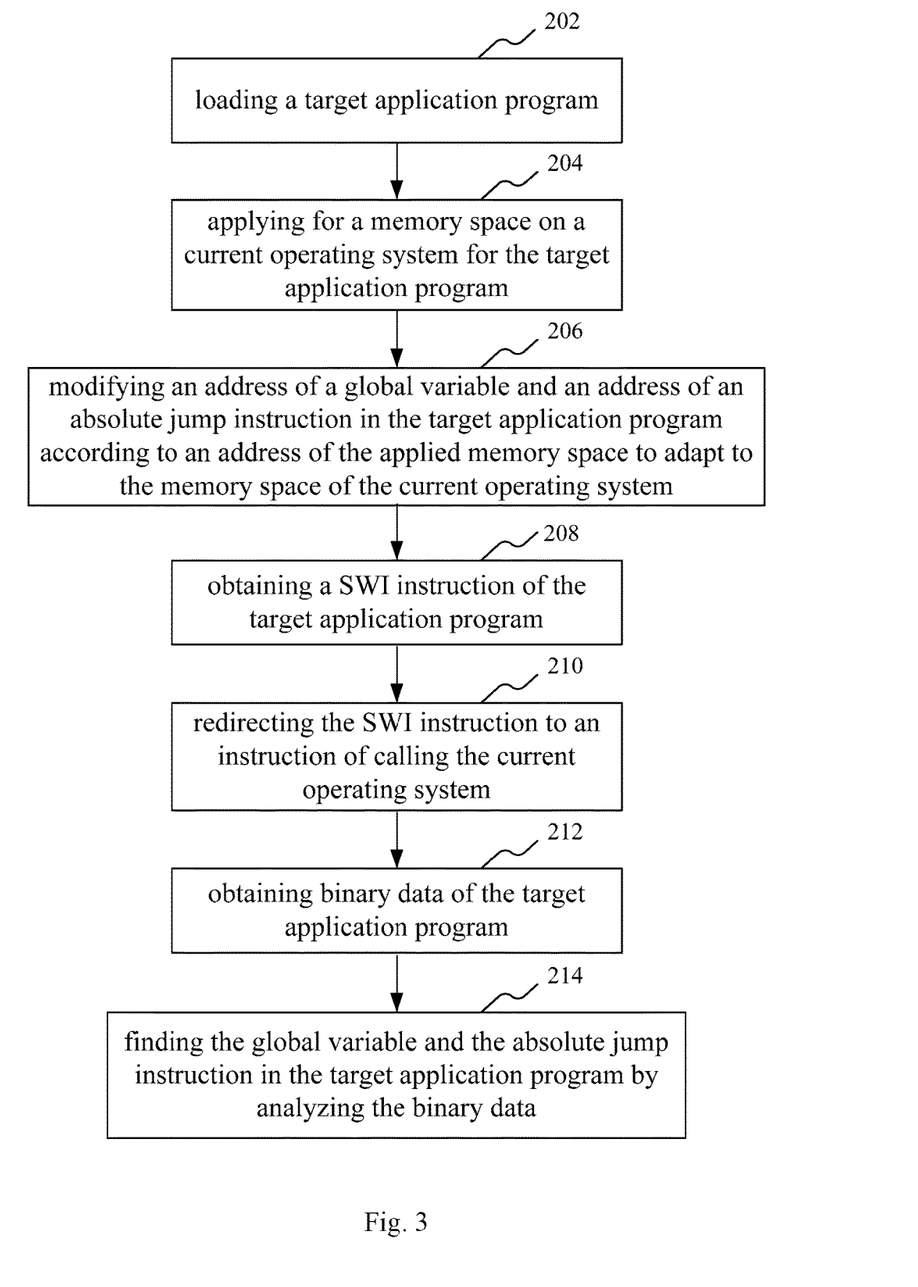
FIG. 3 is a flow chart of a method of running an application program across systems in another embodiment.

Referring to FIG. 3, in an embodiment, prior to the step of modifying the address of the global variable and the address of the jump instruction in the target application program according to the address of the applied memory space to adapt to the memory space of the current operating system, the method further includes:

In step 212, binary data of the target application program is obtained.

Particularly, the virtual machine loads the target application program to obtain the binary data of the target application program. The binary data is the data representation method used by the computer system, because the computer system only recognizes 0 and 1.

In step 214, the global variable and the absolute jump instruction in the target application program are found by analyzing the binary data.

In the embodiment, the virtual machine finds the global variable and the absolute jump instruction in the target application program by analyzing the binary data. Particularly, the absolute address location of the target application program is found by analyzing the binary data of the target application program; and the global variable and the absolute jump instruction in the target application program are found according to the absolute address location of the target application program.

Figure 4:
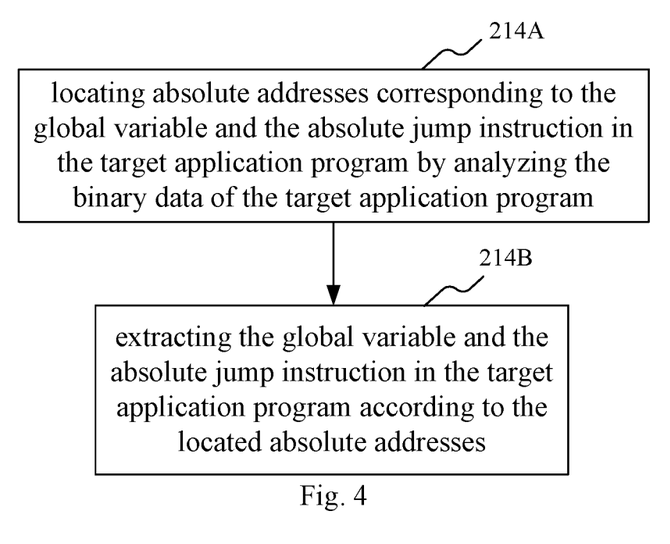
FIG. 4 is a flow chart of a method of finding a global variable and an absolute jump instruction in a target application program by analyzing binary data in an embodiment.

Referring to FIG. 4, in an embodiment, the step of finding the global variable and the absolute jump instruction in the target application program by analyzing the binary data includes:

In step 214A, absolute addresses corresponding to the global variable and the absolute jump instruction in the target application program are located by analyzing the binary data of the target application program.

Particularly, the absolute addresses refer to the independent addresses, that is to say, the real physical storage addresses. Absolute addresses corresponding to the global variable and the absolute jump instruction in the target application program can be located by analyzing the binary data of the target application program, and then the global variable and the absolute jump instruction can be found according to the absolute addresses.

In step 214B, the global variable and the absolute jump instruction in the target application program are extracted according to the located absolute addresses.

Particularly, the global variable is a variable that can be referenced by all objects or functions of the application program, and the absolute jump instruction is a jump instruction that the jumped destination address is an absolute address. The global variable and the absolute jump instruction in the target application program are extracted according to the located absolute addresses, so that the global variable and the absolute jump instruction are copied into the memory space of the current operating system to adapt to the current operating system.

Figure 5:
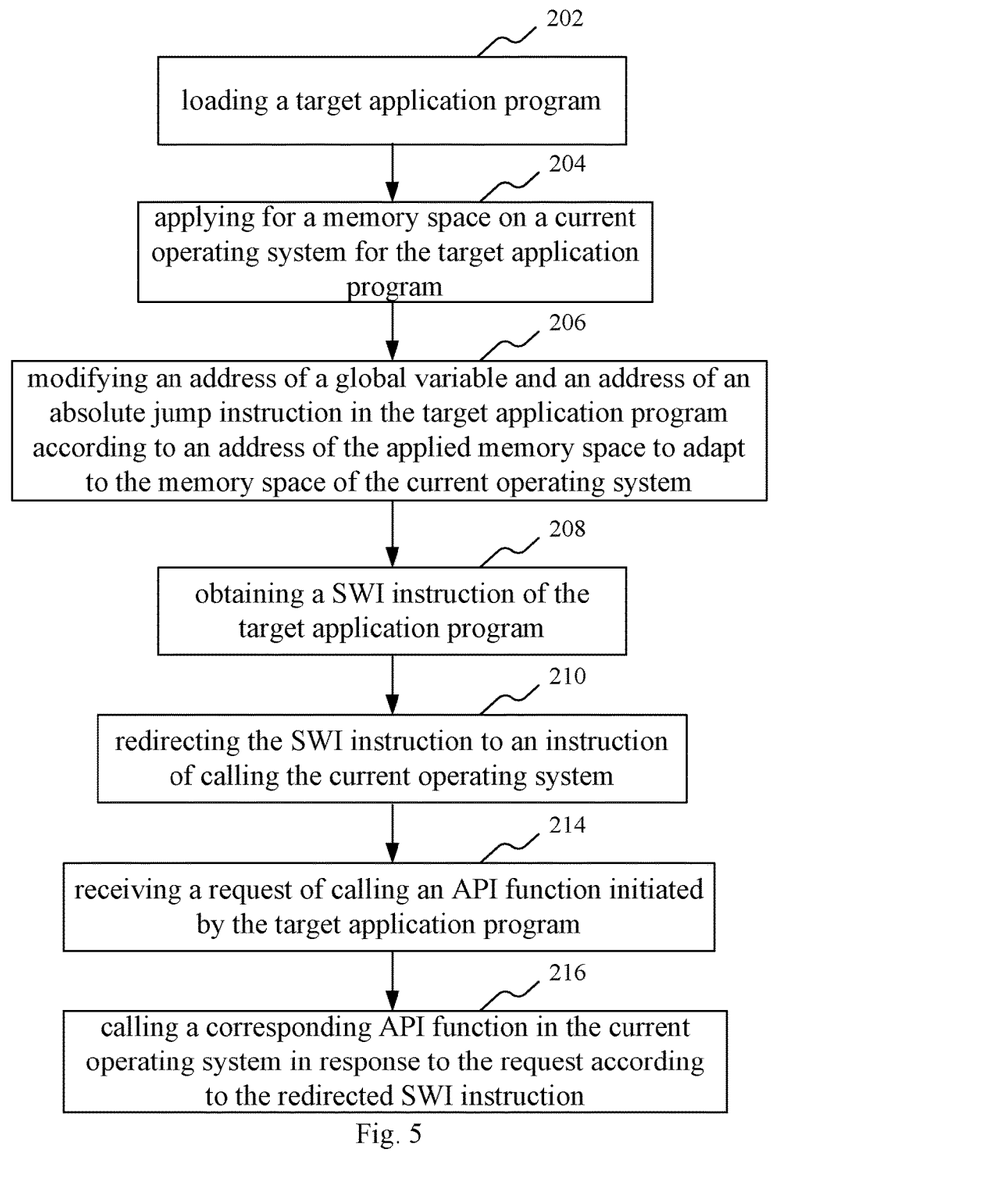
FIG. 5 is a flow chart of a method of running an application program across systems in yet another embodiment.

Referring to FIG. 5, in an embodiment, the above method of running an application program across systems further includes:

In step 214, a request of calling an API function initiated by the target application program is received.

In the embodiment, after the target application program is run on the current system, if the target application program needs to call the current system, it needs to call the current system by the virtual machine. Particularly, the virtual machine receives the request of calling the API function initiated by the target application program.

In step 216, a corresponding API function in the current operating system is called in response to the request according to the redirected SWI instruction.

In the embodiment, because the SWI instruction in the target application program has been redirected to call the instruction of the current system, after the virtual machine receives the request of calling the API function initiated by the target application program, the virtual machine can directly call the corresponding API function in the current system according to the redirected SWI instruction.

In a specific embodiment, Monitor and Prolin are two operating systems of the POS terminal; wherein the Monitor operating system consumes less resources, has simple functions, and is easy to be programmed. More application programs can be developed based on the Monitor system. The Prolin operating system consumes more resources, but has inherent advantages for the multi-task, video play, and multimedia support. Less application programs can be developed based on the Prolin system. Generally, based on different customer requirements, the Monitor system and the Prolin system are run in different POS terminals. The Monitor system and the Prolin system have their own advantages, both of which are complementary to each other. Therefore, if the Monitor application program can be run on the Prolin operating system, various customer requirements can be met. However, because their API interfaces are completely different, the application program developed based on Monitor cannot be directly run on the Prolin system. The conventional method generally implements a system virtual machine by using QEMU (virtual operating system simulator). QEMU simulates an environment similar to a real chip for the application programs developed based on Montior, including the processor, the memory environment, various peripherals (timer, interrupt, serial port and the like). However, this method requires larger space of the memory. Because it needs to simulate the hardware device, and the instructions can only run by using the interpretation method, the running speed of the virtual machine will be significantly reduced. In the embodiment, the application program of Monitor can be run directly on Prolin by developing a process virtual machine; the running manner of interpretation execution and binary translation can be used. Compared with interpretation execution, after codes are translated in binary, codes can be run directly on the CPU run. In the embodiment, translation can be carried out in a manner of binary translation, and because the binary translation does not need the interpretation process, the resources required are less and the corresponding speed is faster.

Figure 6:
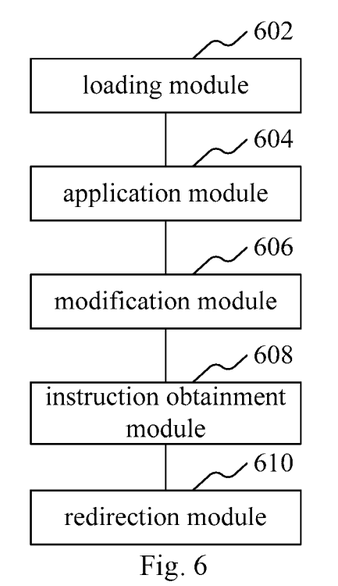
FIG. 6 is a block diagram of a device of running an application program across systems in an embodiment.

Referring to FIG. 6, in an embodiment, a device of running an application program across systems is proposed, and the device includes:

a loading module 602 configured to load a target application program;

an application module 604 configured to apply for a memory space on a current operating system for the target application program;

a modification module 606 configured to modify an address of a global variable and an address of an absolute jump instruction in the target application program according to an address of the applied memory space to adapt to the memory space of the current operating system;

an instruction obtainment module 608 configured to obtain a SWI instruction of the target application program; and a redirection module 610 configured to redirect the SWI instruction to an instruction of calling the current operating system.

Figure 7:
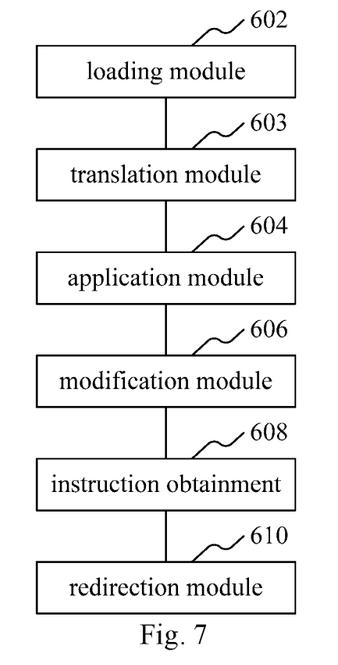
FIG. 7 is a block diagram of a device of running an application program across systems in another embodiment.

Referring to FIG. 7, in an embodiment, the above device of running the application program across systems further includes:

a translation module 603 configured to translate instructions in the target application program in a manner of binary translation.

Figure 8:
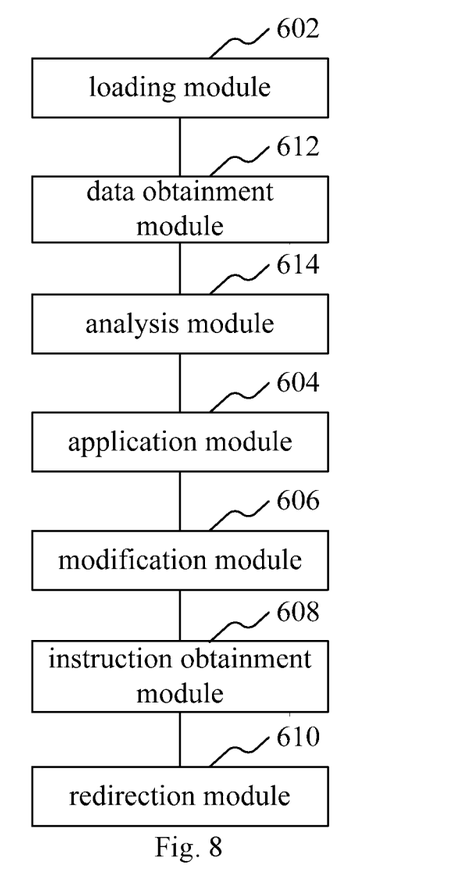
FIG. 8 is a block diagram of a device of running an application program across systems in yet another embodiment.

Referring to FIG. 8, in an embodiment, the above device of running the application program across systems further includes:

a data obtainment module 612 configured to obtain binary data of the target application program; and an analysis module 614 configured to find the global variable and the absolute jump instruction in the target application program by analyzing the binary data.

Figure 9:
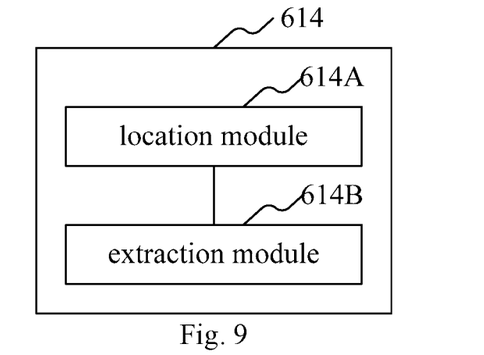
FIG. 9 is a block diagram of an analysis module in another embodiment.

Referring to FIG. 9, in an embodiment, the analysis module 614 includes:

a location module 614A configured to locate absolute addresses corresponding to the global variable and the absolute jump instruction in the target application program by analyzing the binary data of the target application program; and an extraction module 614B configured to extract the global variable and the absolute jump instruction in the target application program according to the located absolute addresses.

Figure 10:
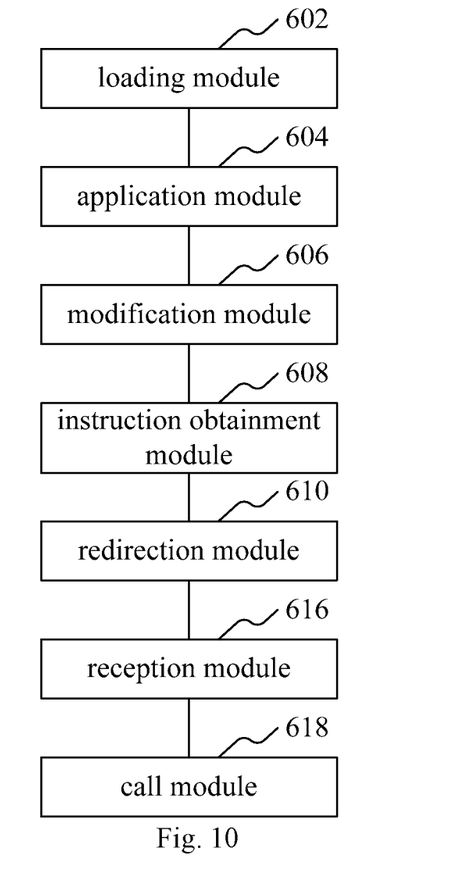
FIG. 10 is a block diagram of a device of running an application program across systems in yet another embodiment.

Referring to FIG. 10, in an embodiment, the above device of running the application program across systems further includes:

a reception module 616 configured to receive a request of calling an API function initiated by the target application program; and a call module 618 configured to call a corresponding API function in the current operating system in response to the request according to the redirected SWI instruction.

Various features of the above embodiments can be combined in any manner. For simplicity of description, all possible combinations of various features in the above embodiments are not described. However, these combinations of these features should be regarded in the scope described in the specification as long as they do not contradict with each other.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of running an application program across systems, the method comprising:

loading a target application program;

applying for a memory space on a current operating system for the target application program;

modifying an address of a global variable and an address of an absolute jump instruction in the target application program according to an address of the applied memory space to adapt to the memory space of the current operating system;

obtaining a software interrupt (SWI) instruction of the target application program; and redirecting the SWI instruction to an instruction of calling the current operating system.

2. The method of claim 1, characterized in that, after the step of loading the target application program, the method further comprises: translating an instruction in the target application program in a manner of binary translation.

3. The method of claim 1, characterized in that, prior to the step of modifying the address of the global variable and the address of the jump instruction in the target application program according to the address of the applied memory space to adapt to the memory space of the current operating system, the method further comprises:
    obtaining binary data of the target application program; and
    finding the global variable and the absolute jump instruction in the target application program by analyzing the binary data.

4. The method of claim 3, characterized in that, the step of finding the global variable and the absolute jump instruction in the target application program by analyzing the binary data comprises:
    locating absolute addresses corresponding to the global variable and the absolute jump instruction in the target application program by analyzing the binary data of the target application program; and
    extracting the global variable and the absolute jump instruction in the target application program according to the located absolute addresses.

5. The method of claim 1, characterized in that, after the step of redirecting the SWI instruction to the instruction of calling the current operating system, the method further comprises:
    receiving a request of calling an application programming interface (API) function initiated by the target application program; and
    calling a corresponding API function in the current operating system in response to the request according to the redirected SWI instruction.

6. A device of running an application program across systems, the device comprising:
    a loading module configured to load a target application program;
    an application module configured to apply for a memory space on a current operating system for the target application program;
    a modification module configured to modify an address of a global variable and an address of an absolute jump instruction in the target application program according to an address of the applied memory space to adapt to the memory space of the current operating system;
    an instruction obtainment module configured to obtain a SWI instruction of the target application program; and
    a redirection module configured to redirect the SWI instruction to an instruction of calling the current operating system.

7. The device of claim 6, characterized in that, the device further comprises a translation module configured to translate instructions in the target application program in a manner of binary translation.

8. The device of claim 6, characterized in that, the device further comprises:
    a data obtainment module configured to obtain binary data of the target application program; and
    an analysis module configured to find the global variable and the absolute jump instruction in the target application program by analyzing the binary data.

9. The device of claim 8, characterized in that, the analysis module comprises:
    a location module configured to locate absolute addresses corresponding to the global variable and the absolute jump instruction in the target application program by analyzing the binary data of the target application program; and
    an extraction module configured to extract the global variable and the absolute jump instruction in the target application program according to the located absolute addresses.

10. The device of claim 6, characterized in that, the device further comprises:
    a reception module configured to receive a request of calling an API function initiated by the target application program; and
    a call module configured to call a corresponding API function in the current operating system in response to the request according to the redirected SWI instruction.

\* \* \* \* \*